Sept. 5, 1950      O. J. ALVAREZ      2,521,558

MAGNIFYING PICTURE VIEWING DEVICE

Filed Feb. 20, 1946

INVENTOR.
Octavio Jose Alvarez
BY
         Agent

Patented Sept. 5, 1950

2,521,558

UNITED STATES PATENT OFFICE 2,521,558

MAGNIFYING PICTURE VIEWING DEVICE

Octavio Jose Alvarez, New York, N. Y., assignor to Alvarez Patent Corporation, New York, N. Y.

Application February 20, 1946, Serial No. 649,007

4 Claims. (Cl. 40—154)

My present invention relates to viewing devices, and more particularly to viewing devices for observation of pictures.

It is an object of my present invention to provide a viewing device constructed so as to create by simple optical means a frame-like effect around the picture to be observed.

It is a further object of my present invention to provide a viewing device which has a stereoscopic effect, i. e. which is built so as to give the observed pictures a three dimensional appearance.

Still a further object of my present invention consists in means which permit attachment of the picture to be viewed to the viewing device in a simple and easy manner.

Another object of my present invention consists in a viewing device which is extremely simple in construction and easy to manufacture.

The novel features which I consider as characteristic for my invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
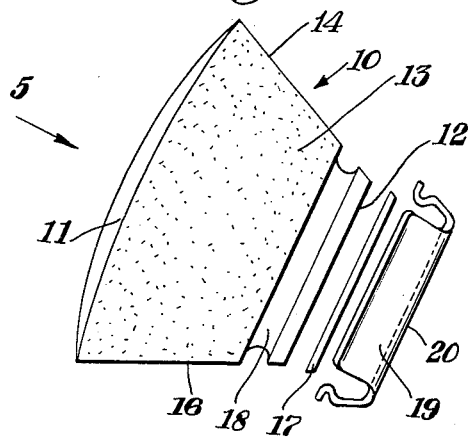
Fig. 1 is an exploded side view of a viewing device of the type proposed by me.

As shown in Fig. 1, the lens member 10 has the shape of a truncated square pyramid. This lens member has a spherical outwardly curved front face 11 which serves as lens face, a flat rear face 12, and four flat side faces 13, 14, 15 and 16. As clearly shown, the spherical lens face 11 is substantially larger than the rear face 12.

It should be noted that only the faces 11 and 12 are transparent, while all side faces 13, 14, 15 and 16 have a translucent preferably ground surface.

For securing the picture 17 to the transparent rear face 12 of the lens member 10, I provide in the side faces of this member a continuous groove 18 arranged parallel to the rear face 12 at a slight distance from the same. Furthermore, I provide the fastening member 19 which consists of a flat pressure member 20 provided along its edges with four clamps 21, 22, 23 and 24. These clamps are adapted to engage the groove 18 as clearly shown in Fig. 2 and to hold the picture 17 in contact with the rear face 12 of the viewing member 10 pressed against the same.

Figure 5:
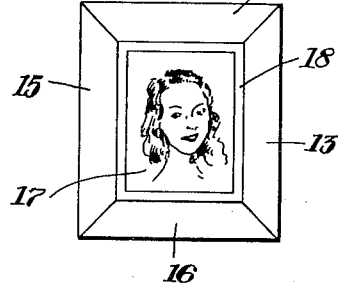
Fig. 5 is a front view of the viewing device shown in Fig. 1, seen in direction of arrow 5 of Fig. 1.

A viewing device of the type described above has, when observed in direction of arrow 5 of Fig. 1 the appearance shown in Fig. 5. As shown in this figure, the picture 17 which itself does not form part of the present invention, is surrounded by groove 18 and the four side faces 13, 14, 15 and 16 of the lens member 10. The groove 18 appears as a separate continuous frame molding while the four side faces 13, 14, 15 and 16 of the viewing member appear as four frame boards surrounding the picture 17.

It should be stressed that this "frame" has a three dimensional appearance, i. e. creates the impression that the picture is actually surrounded by a frame. Furthermore, the picture 17 itself when viewed through such a viewing device has also a three dimensional appearance.

Figure 7:
Fig. 7 is a front view of a viewing device embodying a lens member of the type shown in Fig. 6.
Figure 6:
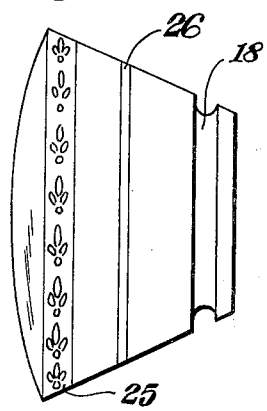
Fig. 6 is a modified embodiment of a lens member.

The viewing device shown in Figs. 6 and 7 is very similar to the one shown in Figs. 1 to 5. The only difference is that the side faces 13, 14, 15 and 16 of the viewing member are provided with two ornamental strips, namely the flower design strip 25 and the uniformly colored translucent strip 26. When viewed from the front, these two strips appear as parts of the frame, as clearly shown in Fig. 7.

Figure 2:
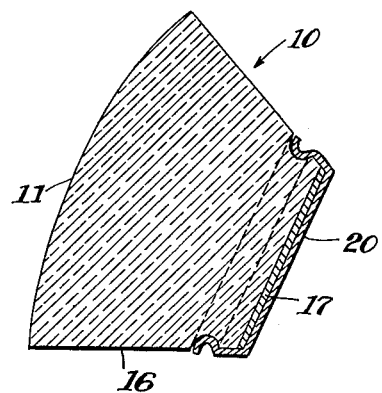
Fig. 2 is a cross section through the viewing device shown in Fig. 1.
Figure 3:
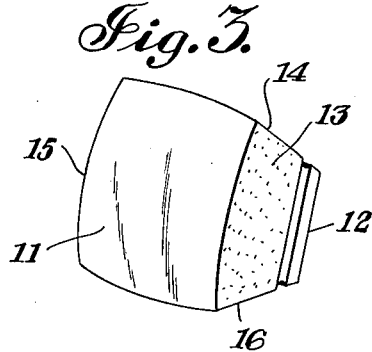
Fig. 3 is a perspective view of the lens member forming part of the viewing device shown in Figs. 1 and 2.
Figure 4:
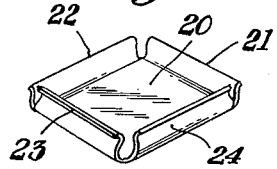
Fig. 4 is a perspective view of the fastening clamp member forming part of the viewing device shown in Figs. 1 and 2.

I wish to stress that as shown in Figs. 1 and 2, my new viewing device has the advantage that no separate supporting means are necessary for holding it in proper viewing position: it can be placed on any flat support in such a manner that it is supported directly by the side face 16 of the viewing member 10 and one of the edges of the fastening member 19.

Furthermore, it should be stressed that the rear face 12 of the lens member 10 need not be square shaped, but it might have the shape of a rectangle. In this event, it is possible to use pictures of different size: if the height of the picture to be viewed is greater than its width, the viewing device will be placed on the support so as to be supported by one of the faces 14 or 16; if the width of the picture to be viewed is greater than its height, the viewing device is simply turned by 90° and is supported by one of the side faces 13 or 15.

It should be stressed that it is of course also possible to provide in viewing devices of the type proposed by me lens members of other shapes, e. g. lens members having the shape of a triangular truncated pyramid or lens members having the shape of a truncated cone.

It will be understood that each of the elements described above, or two or more together, may also find a useful application for other types of viewing devices differing from the types described above.

While I have illustrated and described the invention as embodied in viewing devices for pictures and similar purposes, I do not intend to be limited to the details shown, since various modifications and structural changes may be made without departing in any way from the spirit of my invention.

Without further analysis, the foregoing will so fully reveal the gist of my invention that others can by applying current knowledge readily adapt it for various applications without omitting features that, from the standpoint of prior art, fairly constitute essential characteristics of the generic or specific aspects of this invention and therefore, such adaptations should and are intended to be comprehended within the meaning and range of equivalence of the following claims.

What I claim as new and desire to secure by Letters Patent is:

1. A viewing device comprising in combination a lens member having the shape of a truncated four-sided pyramid and having a curved bottom face serving as image enlarging element, a flat top face serving as picture supporting element, and four tapered side faces tapered toward said flat top face of said lens member and creating—when viewed through said curved bottom face—the optical impression of a four-sided frame surrounding a picture arranged in contact with said flat top face, the length of each of the tapered edges formed by said four tapered side faces of said lens member being substantially equal to the diameter of said flat top face; a continuous retaining groove in said side faces of said lens member parallel to and at a slight distance from said flat top face; and a picture holding member composed of a flat top face and a clamping projection surrounding said flat retaining plate and extending along the edge of the same so as to be adapted to engage said continuous retaining groove in said side faces of said lens member so as to hold the picture placed between said flat retaining plate of said picture holding member and said flat top face of said lens member in contact with the latter.

2. A viewing device comprising in combination a lens member having the shape of a truncated four-sided pyramid and having a curved bottom face serving as image enlarging element, a flat top face serving as picture supporting element, and four tapered side faces tapering toward said flat top face of said lens member and creating—when viewed through said curved bottom face—the optical impression of a four-sided frame surrounding a picture arranged in contact with said flat top face, the length of each of the tapered edges formed by said four tapered side faces of said lens member being substantially equal to the diameter of said flat top face; and a picture holding member composed of a flat retaining plate having substantially the shape of said flat top face and a clamping projection surrounding said flat retaining plate and extending along the edge of the same so as to be adapted to be clamped upon the side faces of said lens member so as to hold a picture placed between said flat retaining plate of said picture holding member and said flat top face of said lens member in contact with the latter.

3. A viewing device comprising in combination a lens member having the shape of a truncated four-sided pyramid and having a curved bottom face serving as image enlarging element, a flat top face serving as picture supporting element, and four tapered side faces tapering toward said flat top face of said lens member and creating—when viewed through said curved bottom face—the optical impression of a four-sided frame surrounding a picture arranged in contact with said flat top face; a continuous retaining groove in said side faces of said lens member parallel to and at a slight distance from said flat top face; and a picture holding member composed of a flat retaining plate having substantially the shape of said flat top face and a clamping projection surrounding said flat retaining plate and extending along the edge of the same so as to be adapted to engage said continuous retaining groove in said side faces of said lens member so as to hold a picture placed between said flat retaining plate of said picture holding member and said flat top face of said lens member in contact with the latter.

4. A viewing device comprising in combination a lens member having the shape of a truncated four-sided pyramid and having a curved bottom face serving as image enlarging element, a flat top face serving as picture supporting element, and four tapered side faces tapering toward said flat top face of said lens member and creating—when viewed through said curved bottom face—the optical impression of a four-sided frame surrounding a picture arranged in contact with said flat top face; and a picture holding member composed of a flat retaining plate having substantially the shape of said flat top face and a clamping projection surrounding said flat retaining plate and extending along the edge of the same so as to be adapted to be clamped upon the side faces of said lens member so as to hold a picture placed between said flat retaining plate of said picture holding member and said flat top face of said lens member in contact with the latter.

OCTAVIO JOSE ALVAREZ.

REFERENCES CITED

The following references are of record in the file of this patent:

UNITED STATES PATENTS

| Number | Name | Date |
|---|---|---|
| D. 137,475 | Morehead | Mar. 14, 1944 |
| 357,689 | Porrera | Feb. 14, 1887 |
| 862,699 | Bierlein et al. | Aug. 6, 1907 |
| 912,329 | Sterrick | Feb. 16, 1909 |
| 1,220,418 | Hawkes | Mar. 27, 1917 |
| 1,415,511 | Bausch | May 9, 1922 |
| 1,469,036 | Davison | Sept. 25, 1923 |
| 1,543,870 | Prange | June 20, 1925 |
| 1,561,730 | Kodama | Nov. 17, 1925 |
| 1,777,859 | Recker | Oct. 7, 1930 |

(Other references on following page)

UNITED STATES PATENTS

| Number | Name | Date |
|---|---|---|
| 1,863,633 | Melind | Mar. 28, 1931 |
| 1,918,243 | Bergand | July 18, 1933 |
| 1,957,263 | Gray | May 1, 1934 |
| 2,057,807 | Whitmore | Oct. 20, 1936 |
| 2,096,524 | Martin | Oct. 19, 1937 |
| 2,107,720 | Swander | Feb. 8, 1938 |
| 2,145,071 | Cave | Jan. 24, 1939 |
| 2,151,573 | Stanley | Mar. 21, 1939 |
| 2,156,351 | Paul | May 21, 1939 |
| 2,176,535 | Markoff | Oct. 17, 1939 |
| 2,220,038 | Kreisler et al. | Oct. 29, 1940 |
| 2,340,421 | Obrist | May 1, 1941 |
| 2,420,021 | Straubel et al. | May 6, 1947 |
| 2,427,870 | Mitchell | Sept. 23, 1947 |

FOREIGN PATENTS

| Number | Country | Date |
|---|---|---|
| 14,455 | Great Britain | Sept. 13, 1890 |
| 421,620 | Great Britain | Dec. 27, 1934 |